United States Patent
Miller et al.

(10) Patent No.: US 8,002,169 B2
(45) Date of Patent: *Aug. 23, 2011

(54) METHODS OF JOINING PROTECTIVE METAL-CLAD STRUCTURES

(75) Inventors: Steven A. Miller, Canton, MA (US); Leonid N. Shekhter, Ashland, MA (US); Stefan Zimmerman, Kraftwerkweg (DE)

(73) Assignee: H.C. Starck, Inc., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/026,370

(22) Filed: Feb. 14, 2011

(65) Prior Publication Data

US 2011/0132534 A1 Jun. 9, 2011

Related U.S. Application Data

(63) Continuation of application No. 11/638,625, filed on Dec. 13, 2006.

(51) Int. Cl.
*B23K 33/00* (2006.01)
*B23K 31/02* (2006.01)

(52) U.S. Cl. ........ 228/165; 228/178; 228/187; 228/199; 427/569

(58) Field of Classification Search .................. 228/165, 228/178, 187, 199; 427/569
See application file for complete search history.

(56) References Cited

U.S. PATENT DOCUMENTS

| | | |
|---|---|---|
| 3,990,784 A | 11/1976 | Gelber |
| 4,011,981 A | 3/1977 | Danna et al. |
| 4,073,427 A | 2/1978 | Keifert et al. |
| 4,140,172 A | 2/1979 | Corey |
| 4,202,932 A | 5/1980 | Chen et al. |
| 4,291,104 A | 9/1981 | Keifert |
| 4,459,062 A | 7/1984 | Siebert |
| 4,483,819 A | 11/1984 | Albrecht et al. |
| 4,508,563 A | 4/1985 | Bernard et al. |
| 4,510,171 A | 4/1985 | Siebert |
| 4,537,641 A | 8/1985 | Albrecht et al. |
| 4,722,756 A | 2/1988 | Hard |
| 4,731,111 A | 3/1988 | Kopatz et al. |
| 4,818,629 A | 4/1989 | Jenstrom et al. |

(Continued)

FOREIGN PATENT DOCUMENTS

DE 10253794 A1 6/2004

(Continued)

OTHER PUBLICATIONS

"Cold Gas Dynamic Spray CGSM Apparatus," Tev Tech LLC, available at: http://www.tevtechllc.com/cold_gas.html (accessed Dec. 14, 2009).

(Continued)

*Primary Examiner* — Jessica L Ward
*Assistant Examiner* — Erin B Saad
(74) *Attorney, Agent, or Firm* — Bingham McCutchen LLP

(57) ABSTRACT

In various embodiments, a method of joining clad structures includes providing first and second clad structures each comprising a protective layer disposed only partially over a steel layer such that an edge region of the steel layer is exposed, joining the first and second clad structures at their respective edge regions, thereby forming a joint, and cold spraying a metal powder over and in contact with (i) the joint, (ii) the edge regions, and (iii) the protective layers of the first and second clad structures, thereby directly connecting the protective layers of the first and second clad structures with a layer of unmelted metal powder.

24 Claims, 2 Drawing Sheets

U.S. PATENT DOCUMENTS

| | | | |
|---|---|---|---|
| 4,915,745 A | 4/1990 | Pollock et al. |
| 4,964,906 A | 10/1990 | Fife |
| 5,091,244 A | 2/1992 | Biornard |
| 5,242,481 A | 9/1993 | Kumar |
| 5,270,858 A | 12/1993 | Dickey |
| 5,302,414 A | 4/1994 | Alkhimov et al. |
| 5,305,946 A | 4/1994 | Heilmann |
| 5,580,516 A | 12/1996 | Kumar |
| 5,612,254 A | 3/1997 | Mu et al. |
| 5,679,473 A | 10/1997 | Murayama et al. |
| 5,693,203 A | 12/1997 | Ohhashi et al. |
| 5,795,626 A | 8/1998 | Gabel et al. |
| 5,859,654 A | 1/1999 | Radke et al. |
| 5,954,856 A | 9/1999 | Pathare et al. |
| 5,972,065 A | 10/1999 | Dunn et al. |
| 5,993,513 A | 11/1999 | Fife |
| 6,136,062 A | 10/2000 | Loffelholz et al. |
| 6,139,913 A | 10/2000 | Van Steenkiste et al. |
| 6,171,363 B1 | 1/2001 | Shekhter et al. |
| 6,189,663 B1 | 2/2001 | Smith et al. |
| 6,197,082 B1 | 3/2001 | Dorvel et al. |
| 6,238,456 B1 | 5/2001 | Wolf et al. |
| 6,258,402 B1 | 7/2001 | Hussary et al. |
| 6,261,337 B1 | 7/2001 | Kumar |
| 6,328,927 B1 | 12/2001 | Lo et al. |
| 6,331,233 B1 | 12/2001 | Turner |
| 6,444,259 B1 | 9/2002 | Subramanian et al. |
| 6,482,743 B1 | 11/2002 | Sato |
| 6,491,208 B2 | 12/2002 | James et al. |
| 6,502,767 B2 | 1/2003 | Kay et al. |
| 6,521,173 B2 | 2/2003 | Kumar et al. |
| 6,558,447 B1 | 5/2003 | Shekhter et al. |
| 6,589,311 B1 | 7/2003 | Han et al. |
| 6,669,782 B1 | 12/2003 | Thakur |
| 6,722,584 B2 | 4/2004 | Kay et al. |
| 6,749,002 B2 | 6/2004 | Grinberg et al. |
| 6,759,085 B2 | 7/2004 | Muehlberger |
| 6,770,154 B2 | 8/2004 | Koenigsmann et al. |
| 6,773,969 B2 | 8/2004 | Lee et al. |
| 6,855,236 B2 | 2/2005 | Sato et al. |
| 6,905,728 B1 | 6/2005 | Hu et al. |
| 6,911,124 B2 | 6/2005 | Tang et al. |
| 6,915,964 B2 | 7/2005 | Tapphorn et al. |
| 6,919,275 B2 | 7/2005 | Chiang et al. |
| 6,924,974 B2 | 8/2005 | Stark |
| 6,953,742 B2 | 10/2005 | Chen et al. |
| 6,962,407 B2 | 11/2005 | Yamamoto et al. |
| 7,053,294 B2 | 5/2006 | Tuttle et al. |
| 7,067,197 B2 | 6/2006 | Michaluk et al. |
| 7,081,148 B2 | 7/2006 | Koenigsmann et al. |
| 7,101,447 B2 | 9/2006 | Turner |
| 7,108,893 B2 | 9/2006 | Van Steenkiste et al. |
| 7,128,988 B2 | 10/2006 | Lambeth |
| 7,164,205 B2 | 1/2007 | Yamaji et al. |
| 7,170,915 B2 | 1/2007 | McDonald |
| 7,175,802 B2 | 2/2007 | Sandlin et al. |
| 7,178,744 B2 | 2/2007 | Tapphorn et al. |
| 7,183,206 B2 | 2/2007 | Shepard |
| 7,192,623 B2 | 3/2007 | Andre et al. |
| 7,208,230 B2 | 4/2007 | Ackerman et al. |
| 7,399,335 B2 | 7/2008 | Shekhter et al. |
| 7,479,299 B2 | 1/2009 | Raybould et al. |
| 2002/0112789 A1 | 8/2002 | Jepson et al. |
| 2002/0112955 A1 | 8/2002 | Aimone et al. |
| 2003/0023132 A1 | 1/2003 | Melvin et al. |
| 2003/0190413 A1 | 10/2003 | Van Steenkiste et al. |
| 2003/0219542 A1 | 11/2003 | Ewasyshyn et al. |
| 2003/0232132 A1 | 12/2003 | Muehlberger |
| 2004/0037954 A1 | 2/2004 | Heinrich et al. |
| 2004/0065546 A1 | 4/2004 | Michaluk et al. |
| 2004/0076807 A1 | 4/2004 | Grinberg et al. |
| 2004/0126499 A1 | 7/2004 | Heinrich et al. |
| 2005/0084701 A1 | 4/2005 | Slattery |
| 2005/0120957 A1 | 6/2005 | Kowalsky et al. |
| 2005/0142021 A1 | 6/2005 | Aimone et al. |
| 2005/0155856 A1 | 7/2005 | Oda |
| 2005/0220995 A1 | 10/2005 | Hu et al. |
| 2005/0252450 A1 | 11/2005 | Kowalsky et al. |
| 2006/0021870 A1 | 2/2006 | Tsai et al. |
| 2006/0032735 A1 | 2/2006 | Aimone et al. |
| 2006/0042728 A1 | 3/2006 | Lemon et al. |
| 2006/0045785 A1 | 3/2006 | Hu et al. |
| 2006/0090593 A1 | 5/2006 | Liu |
| 2006/0121187 A1 | 6/2006 | Haynes et al. |
| 2006/0251872 A1 | 11/2006 | Wang et al. |
| 2007/0172378 A1 | 7/2007 | Shibuya et al. |
| 2008/0078268 A1 | 4/2008 | Shekhter et al. |
| 2008/0145688 A1 | 6/2008 | Miller et al. |
| 2008/0171215 A1 | 7/2008 | Kumar et al. |
| 2008/0216602 A1 | 9/2008 | Zimmermann et al. |
| 2008/0271779 A1 | 11/2008 | Miller et al. |
| 2010/0015467 A1 | 1/2010 | Zimmermann et al. |
| 2010/0055487 A1 | 3/2010 | Zimmermann et al. |
| 2010/0061876 A1 | 3/2010 | Miller et al. |
| 2010/0086800 A1 | 4/2010 | Miller et al. |
| 2010/0272889 A1 | 10/2010 | Shekhter et al. |

FOREIGN PATENT DOCUMENTS

| | | |
|---|---|---|
| EP | 0 074 803 A1 | 3/1983 |
| EP | 0484533 A1 | 5/1992 |
| EP | 0 774 315 A2 | 5/1997 |
| EP | 1 066 899 A2 | 1/2001 |
| EP | 1 138 420 A2 | 10/2001 |
| EP | 1 350 861 A1 | 10/2003 |
| EP | 1 382 720 A2 | 1/2004 |
| EP | 1 413 642 A1 | 4/2004 |
| GB | 2121441 A | 12/1983 |
| GB | 2394479 A | 4/2004 |
| JP | 06346232 A | 12/1994 |
| RU | 2166421 | 5/2001 |
| WO | WO-9837249 | 8/1998 |
| WO | WO-0112364 A1 | 2/2001 |
| WO | WO-02064287 A2 | 8/2002 |
| WO | WO-03/062491 A2 | 7/2003 |
| WO | WO-03/106051 A1 | 12/2003 |
| WO | WO-2004074540 A1 | 9/2004 |
| WO | WO-2005073418 A1 | 8/2005 |
| WO | WO-2006117145 A2 | 11/2006 |
| WO | WO-2008/089188 A1 | 7/2008 |

OTHER PUBLICATIONS

"Cold Spray Process," Handbook of Thermal Spray Technology, ASM International, Sep. 2004, pp. 77-84.

Ajdelsztajn et al., "Synthesis and Mechanical Properties of Nanocrytalline Ni Coatings Produced by Cold Gas Dynamic Spraying," 201 Surface and Coatings Tech. 3-4, pp. 1166-1172 (Oct. 2006).

Gärtner et al., "The Cold Spray Process and its Potential for Industrial Applications," 15 J. of Thermal Sprsy Tech. 2, pp. 223-232 (Jun. 2006).

Hall et al., "The Effect of a Simple Annealing Heat Treatment on the Mechanical Properties of Cold-Sprayed Aluminum," 15 J. of Thermal Spray Tech. 2, pp. 233-238 (Jun. 2006.)

Hall et al., "Preparation of Aluminum Coatings Containing Homogeneous Nanocrystalline Microstructures Using the Cold Spray Process," JTTEES 17:352-359, Sep. 2008.

IPRP in International Patent Application No. PCT/EP2006/003967, dated Nov. 6, 2007 (15 pages).

IPRP in International Patent Application No. PCT/US2008/062434, dated Nov. 10, 2009 (21 pages).

IPRP in International Patent Application No. PCT/EP2006/003969, mailed dated Nov. 6, 2007 (13 pages).

International Search Report and Written Opinion in International Patent Application No. PCT/US2007/087214, mailed Mar. 23, 2009 (13 pages).

IPRP in International Patent Application No. PCT/US2007/081200, dated Sep. 1, 2009 (17 pages).

IPRP in International Patent Application No. PCT/US2007/080282, dated Apr. 7, 2009 (15 pages).

Irissou et al., "Review on Cold Spray Process and Technology: Part I—Intellectual Property," 17 J. of Thermal Spray Tech. 4, pp. 495-516 (Dec. 2008).

Karthikeyan, "Cold Spray Technology: International Status and USA Efforts," ASB Industries, Inc. (Dec. 2004).

Li et al., "Effect of Annealing Treatment on the Microstructure and Properties of Cold-Sprayed Cu Coating," 15 J. of Thermal Spray Tech. 2, pp. 206-211 (Jun. 2006).

Marx et al., "Cold Spraying—Innovative Layers for New Applications," 15 J. of Thermal Spray Tech. 2, pp. 177-183 (Jun. 2006).

Morito, "Preparation and Characterization of Sintered Mo-Re Alloys," 3 J. de Physique 7, Part 1, pp. 553-556 (1993).

Search Report in European Patent Application No. 09172234.8, dated Jan. 29, 2010 (7 pages).

Stoltenhoff et al., "An Analysis of the Cold Spray Process and its Coatings," 11 J. of Thermal Spray Tech. 4, pp. 542-550 (Dec. 2002).

Van Steenkiste et al., "Analysis of Tantalum Coatings Produced by the Kinetic Spray Process," 13 J. of Thermal Spray Tech. 2, pp. 265-273 (Jun. 2004).

Examination Report in European Patent Application No. 09172234.8, mailed Jun. 16, 2010 (3 pages).

Kosarev et al., "Recently Patent Facilities and Applications in Cold Spray Engineering," Recent Patents on Engineering, vol. 1 pp. 35-42 (2007).

Examination Report in European Patent Application No. 07843733.2, mailed Nov. 30, 2010 (9 pages).

METHODS OF JOINING PROTECTIVE METAL-CLAD STRUCTURES

CROSS-REFERENCE TO RELATED APPLICATION

This application is a continuation of U.S. patent application Ser. No. 11/638,625, filed on Dec. 13, 2006, the content of which is incorporated by reference herein in its entirety.

BACKGROUND OF THE INVENTION

Tantalum is a highly corrosion resistant, bio-friendly metal. As a result it finds wide use in reactors, heat exchangers, piping and the like in the chemical and pharmaceutical processing industries. Because tantalum is very expensive often the structural components used in this equipment are made up of a steel or stainless steel section for strength purposes that is clad with a thin sheet of tantalum to prevent interaction with the process fluid. In order for the tantalum sheet to provide corrosion protection for a whole vessel many such sheets must be joined together into a single impermeable piece. Many techniques have been used but all of them are costly, have severe deficiencies, and cause the cost of the basic tantalum clad steel section to be higher than necessary. This invention provides a low cost, chemical resistant, material and manpower efficient means of joining the tantalum sheets together.

Cold spray or kinetic spray (see U.S. Pat. Nos. 5,302,414, 6,502,767 and 6,759,085) is an emerging industrial technology that is being employed to solve many industrial manufacturing challenges (see, e.g., U.S. Pat. Nos. 6,924,974, 6,444,259, 6,491,208 and 6,905,728). Cold spray employs a high velocity gas jet to rapidly accelerate powder particles to high velocity such that when they impact a surface the particles bond to the surface to form an integral, well bonded and dense coating. The cold spraying of tantalum powders onto a variety of substrates (including steel) has been suggested (see, e.g., "Analysis of Tantalum Coatings Produced by the Kinetic Spray Process," Van Steenkiste et al, Journal of Thermal Spray Technology, volume 13, number 2, June 2004, pages 265-273; "Cold spraying—innovative layers for new applications," Marx et al, Journal of Thermal Spray Technology, volume 15, number 2, June 2006, pages 177-183; and "The Cold Spray Process and Its Potential for Industrial Applications," Gärtner et al, Journal of Thermal Spray Technology, volume 15, number 2, June 2006, pages 223-232). This is all accomplished without having to heat the tantalum powder to a temperature near or above its melting point as is done with traditional thermal spray processes. The fact that dense coatings can be formed at low temperatures present many advantages. Such advantages include reduced oxidation, high density deposits, solid state compaction, the lack of thermally induced stresses and particularly, in this case, the lack of substrate heating. This is critical because at elevated temperatures, such as in a molten Ta weld pool, Ta can dissolve the elemental components of steels and stainless steels with the result that brittle and non corrosion resistant phases form in the tantalum.

As mentioned above, tantalum is a preferred corrosion resistant material in industries that process chemically aggressive liquids. Because of tantalum's high cost rather than being used as a thick structural member, it is frequently used in thin layers as a protective cladding on steel or stainless steel. Many techniques have been developed to attach tantalum clad to the substrate material such as high temperature brazing (U.S. Pat. No. 4,291,104), low temperature soldering (U.S. Pat. No. 4,011,981), diffusion bonding (U.S. Pat. No. 5,693,203), explosive bonding (U.S. Pat. No. 4,291,104), and flouroelastomers (U.S. Pat. No. 4,140,172).

The fabrication problem becomes difficult and expensive however when the individually clad components must be joined together to form a fully functional vessel such as a process reactor. The clad must be fused together to prevent the process liquid from contacting the steel, the steel must also be fused to provide strength to the entire structure. Dissolution of the steel into the tantalum during either fusion process would immediately destroy the desirable properties of tantalum. Thus, all high temperature fusion processes require and use elaborate joint designs and fabrication techniques in order to prevent the tantalum from reaction with the steel during the fusion process.

U.S. Pat. No. 4,073,427 solves the problem of joining the sheets by providing a machined groove around the entire perimeter of all of the structural parts to be joined. The structural steel is then welded and a machined tantalum batten is inserted in the groove to isolate the tantalum from the steel when the tantalum is welded. The tantalum sheet can then be bent flat (it has to be bent up initially to allow insertion of the batten) and the final tantalum weld performed. Further due to the high temperatures involved purge holes must be provided in the steel element to allow for the introduction of inert gases to protect the final tantalum weld.

U.S. Pat. No. 4,818,629 provides a similar approach except that three battens are used, one steel and two tantalum battens. This approach requires two welds as well as multiple purge holes drilled in the steel backing sheet.

U.S. Pat. No. 5,305,946 attempts to improve on the above processes by providing a wide single batten that completely fills the gap between the two tantalum sheets and then double welding a tantalum closure across the top of the tantalum sheets. All of the references discussed so far are done so in terms of joining flat sections. The problems become far more difficult when welding rings to rings to form long vessels, or domes to rings to provide a pressure closure or even vessel penetrations for piping. Bending the tantalum sheet in a circular pattern, then bending 90 degrees out of the plane of the circle, inserting the batten and bending the two tantalum sheets flat again is time consuming and difficult.

U.S. Pat. No. 4,459,062 describes a process using a plasma arc spray overlay to cover the contaminated weld of the tantalum protective layer. First the steel is welded to itself and then the tantalum is welded to itself. Because the tantalum is in intimate contact with the steel, the steel contaminates the tantalum weld and the corrosion resistance of the weld is greatly reduced. A high temperature plasma arc spray is used to provide a protective layer of tantalum over the contaminated weld. Because these joints are used on large structures they usually must be made in air, thus the hot plasma arc causes both the tantalum sheet and the tantalum powder to oxidize due to the plasma's very high temperature. The result is a porous, lamellar structure in the deposit that is high in oxygen content. The porosity and porous grain boundaries greatly reduce the corrosion resistance by percolation effects and the high oxygen content results in a less ductile (than the tantalum sheet) deposit that is prone to cracking and can fail during operation. Additionally, because the coating is put down hot, and because the coefficient of thermal expansion for tantalum is almost double that of steel, as the structure cools the brittle plasma spray deposit is put in a state of tensile stress, a stress that potentially can lead to cracking and failure of the coating.

U.S. Pat. No. 6,749,002 describes a method of spray joining articles. The patent indicates that cold spray as well as the many types of hot spray forming techniques (such as plasma and twin wire arc spraying) could be used. However, the method is severely limited in that at least one of the articles must be a spray formed steel article and the sprayed particles must be steel particles. Clearly this method is used for making structural steel joints involving at least one steel component. In the invention described below the structural steel joint is provided by traditional welding techniques. In fact there is no desire or requirement that the sprayed material join to the steel. In the present invention, the cold sprayed material, in this case tantalum, is used to join the tantalum surface coating and to provide an impermeable corrosion resistant layer of tantalum between two or more co-existing Ta sheets.

U.S. Pat. No. 6,258,402 is even more limited in that it describes a method for repairing spray formed steel tooling. It too requires a steel spray formed part on which a steel spray formed coating will be used to fill a region which has been damaged or somehow eroded away. Additionally, once the spray forming is complete, the spray formed filler is melted and fused using conventional electric welding processes. The purpose of the invention below is to avoid heating and especially melting of the tantalum during the joining processes.

DESCRIPTION OF THE INVENTION

Figure 1:
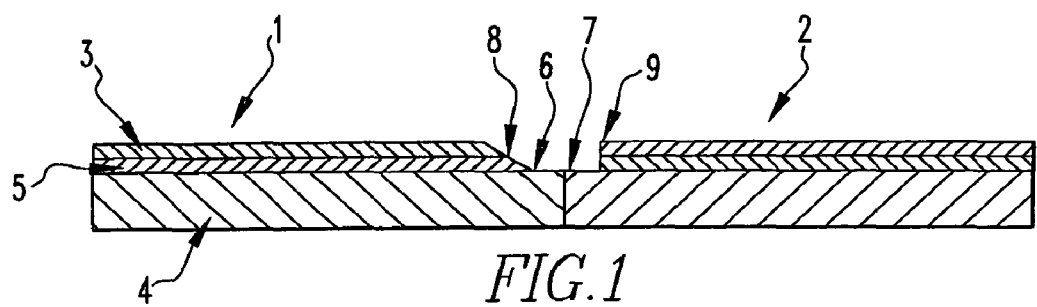
FIG. 1 shows the tantalum clad sections before joining.

The present invention is broadly directed to a process for joining tantalum clad steel structures comprising:
  a) providing a first tantalum clad section, said first tantalum clad section comprising a tantalum layer over a steel layer, with a bonding layer optionally therebetween, with a portion of said steel layer in an edge region not being covered by said tantalum layer or said bonding layer,
  b) providing a second tantalum clad section, said second tantalum clad section comprising a tantalum layer over a steel layer, with a bonding layer optionally therebetween, with a portion of said steel layer in an edge region not being covered by said tantalum layer or said bonding layer,
  c) locating said steel edge regions adjacent each other,
  d) welding the steel edge regions together,
  e) cold spraying a tantalum powder onto the welded edge regions and over the tantalum layers adjacent said edge regions thereby joining the tantalum clad steel sections.

The invention is also directed to a tantalum weld or joint, wherein the weld or joint is formed by cold spraying tantalum powder and consists of elongated tantalum powder particles, elongated normal to the direction of the spray direction, and wherein the powdered particles have a random crystallographic orientation. The invention is also directed to a tantalum weld or joint, wherein the weld or joint is formed by cold spraying tantalum powder followed by heta treatment and consists of equiaxed grains of approximately the same size as or smaller than the sprayed powder and wherein the grains have a random crystallographic orientation.

In one embodiment, a double sided lap joint may be used, although a single sided lap joint may be employed as well.

In one preferred embodiment, each tantalum clad section is produced by cold spraying tantalum powder directly onto the respective steel layer in a pattern such that a portion of each steel layer in an edge region is not sprayed and is thus left exposed. This embodiment does, not require the use of a bonding layer.

Local failures can develop in tantalum clad vessels and do occur frequently. A local failure is when the bulk of the cladding is fine, but a small crack or pinhole may have developed in the clad. This can result from a manufacturing defect (e.g., a gouged tantalum layer, a weld defect or an inclusion), a local hot spot or improper process chemistry. The normal procedure is to enter the vessel, cut out the defect and then weld a patch on top. Of course in doing this there is the risk of overheating the tantalum layer and oxidizing it or causing an undesirable reaction with the steel below the weld. Although not a part of this invention, cold spray could be used to repair these defects without incurring any of the risks just mentioned.

As used herein, the term "steel" is intended to include both steel and stainless steel.

This invention, the cold welding of the tantalum sheet using cold spray technology, forms a high density, low cost, corrosion resistant joint free from the deleterious phase mentioned above. It further allows the joining of clad steel parts where the tantalum clad to steel bonding agent is a low melting temperature solder, brazing material or even a structural adhesive.

By following the present invention, the tantalum layer and the steel substrate require no special machining to provide locations for the insertion of protective battens, since battens are not used. Obviously, machining of battens or other protective strips is not required.

In the preferred embodiment, the protective cladding can be simply cut with either a straight or beveled edge such that the desired amount of steel substrate is left exposed prior to bonding of the cladding to the plate. This eliminates the many folding and unfolding operations used with cladding that must be joined by elevated temperature processes such as welding. A separate bonding or brazing layer may or may not be present depending on how the tantalum is bonded to steel. The clad sections may simply be placed together and the structural steel butt welded to form a single unit. The resultant seam is then filled, and cold welded together by cold spraying tantalum powder into the seam and over the edges of the tantalum clad layer.

Because the cold spray process is done at low temperatures, there is no harmful dissolution of the steel into the cold sprayed tantalum joint. The tantalum joint is fully dense with no porosity or oxygen pick up which would impair the joints performance. Furthermore, there are no thermally induced stresses at the joint after fabrication that could lead to separation, buckling or cracking. Stress is an issue with all high temperature joining processes due to the large differences in thermal expansion between tantalum (LCTE=$6.5 \times 10^{-6}$ cm (cm °C.)$^{-1}$ and steel (LCTE=$11.7 \times 10^{-6}$ cm (cm °C.)$^{-1}$ In fact to completely eliminate thermal stress during operation, the spraying could be done while the components are held at operational temperatures of less than 250° C.

The present invention also raises the potential for greatly decreasing the cost of the basic tantalum clad steel component. Since the joining of the tantalum layer is done at low temperatures, there is no potential for burn through of the cladding as with high temperature processes that melt the clad to form a fusion joint. Thus, reliable cold joining on tantalum cladding of very low thicknesses is possible. By following the present invention, it is possible to use thickness of the tantalum clad as low as about 0.005 inches (preferably from about 0.005 inches to about 0.040 inches, more preferably from about 0.005 inches to about 0.020 inches, and most preferably from about 0.005 inches to about 0.010 inches). This can result in the use of substantially thinner cladding and a proportionate cost savings when compared to welding techniques that require substantially thicker cladding for reliable "in the field" welds (normal welding techniques require that the clad be around 0.02 inches, while explosive bonding requires thicknesses of 0.04 inches).

Since the process operates at relatively low temperatures, low cost techniques can be employed to bond the clad to the steel substrate, such as using structural adhesives and non-noble metal low temperature solders. Both of these approaches eliminate the need for large high temperature (~1000° C.) vacuum furnaces, the attendant energy and labor costs of heating large structural pieces to high temperature and the use of expensive noble metal brazes or silver solders. Structural adhesives decompose around 300° C. and low temperature solders melt around 400° C. The need to weld, i.e., exceed the melting point of tantalum (2998° C.), or to use plasma arc spray (the lowest temperatures are typically in excess of 3000° C.) precludes the use of low temperature bonding of the cladding to the steel since the high temperature process for the clad to clad joint would destroy the bond. Cold spray does not have this problem and could be used to join an entirely new class of low cost clad materials. Most tantalum process applications operate at temperatures of less than 250° C. and thus allow for the use of the above discussed bonding agents.

As is known in the art, various gas/powder velocities can be used in the cold spray process. Generally these velocities are in the range of from 300 to 2,000 meters/second. It is generally advantageous for the powder particles to be available in an amount in the stream, which guarantees a flow rate density of the particles from 0.01 to 100 grams/(second $cm^2$) preferably from 0.01 grams/(second $cm^2$) up to 20 grams/(second $cm^2$) and most preferably from of 0.05 grams/(second $cm^2$) up to 17 grams/(second $cm^2$). The flow rate density is calculated according to the formula $F=m/[(\pi/4)*D^2]$ with F=flow rate density, D=nozzle diameter in cm and m=powder delivery rate (in grams per second).

Generally, a stable gas such as nitrogen, or an inert gas such as argon or helium is used as the gas with which the metal powder forms the gas/powder mixture.

Finally, the process may be used to join many types of metals used as protective cladding such as niobium, titanium, zirconium, molybdenum and tungsten.

In the Figures, the same numbers are used to identify the same element. In FIG. 1, two sections, 1 and 2, are placed adjacent each other. Each section has a tantalum layer 3, over a steel layer 4, with a bonding or brazing layer 5 therebetween. Each section has a portion (6 and 7) of the steel layer that is not covered (these exposed sections are only idenfied by number in FIG. 1—but are shown in each figure). In the left hand section, the portion is exposed via a beveled edge 8, while in the right section, the portion is exposed via a straight edge 9. The beveled edge embodiment is generally preferred.

Processes for the production of tantalum clad steel are known in the art. If desired, tanatlum could be cold sprayed onto the steel (thus eliminating the need for a bonding or brazing layer). The spray configuration could be such that edge portions of the steel would be left uncoated. Alternatively, portions of the tantalum layer and, if present, the bonding or brazing layer could be removed to expose the steel edge portions.

Figure 2:
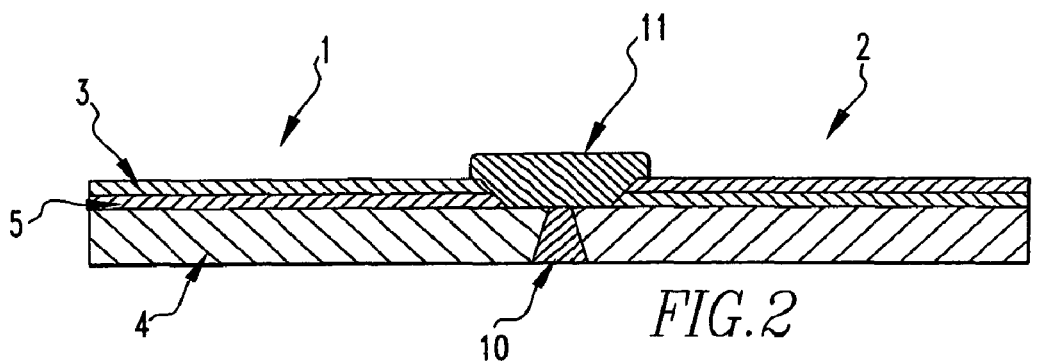
FIG. 2 shows the sections joined together.

As shown in FIG. 2, the exposed portions of the steel are welded 10 and a tantalum powder, 11, is sprayed over the welded edges as well over the tantalum layer adjacent to the exposed portions.

Figure 3:
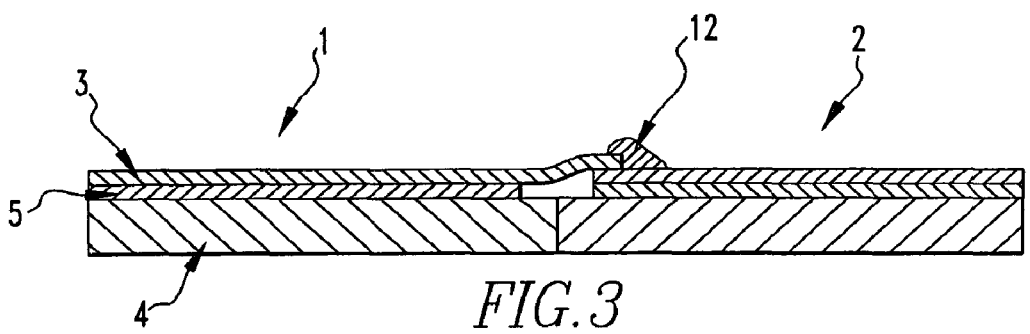
FIG. 3 shows another embodiment of the invention where a lap joint is used.

FIG. 3 shows a single lap weld (12). This approach has the advantage of requiring less Ta powder to make the weld (there is no gap to fill) but has the disadvantage that once the steel structure is welded, the larger (upper) piece of tantalum has to be bent and hammered down flat over the lower (smaller) piece of tantalum (another labor operation).

Figure 4:
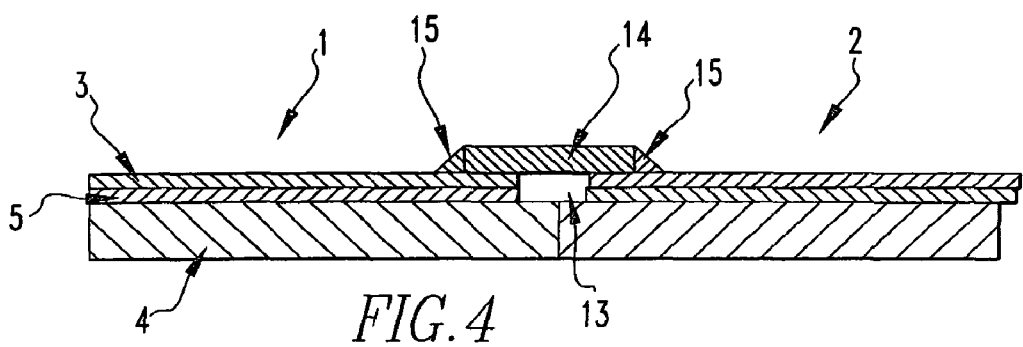
FIG. 4 shows another embodiment of the invention where a double lap joint is used.

FIG. 4 shows another embodiment wherein a double lap weld (15) is employed. This approach eliminates the bending and hammering operation required by the embodiment shown in FIG. 3, but does use more powder and requires a tantalum batten, 13, to fill the gap formed by the exposed steel portions and a tantalum sheet, 14, to join the two tantalum sections.

To simulate the joining of two tantalum clad steel plates in a reactor vessel, a 0.020" thick tantalum sheet was bonded to a nominal ⅜" steel plate, using a high temperature, silver-copper eutectic braze (Bag-8, commercially available from Lucas Milhaupt of Cudahy Wis.). Then a groove was milled approximately 0.022" deep and nominally 0.20" wide down the length of the tantalum cladding to simulate the gap that would be left between the tantalum sheets after welding of the steel plate. Next using nitrogen gas preheated to 600° C. at a stagnation pressure of 3 MPa, tantalum powder 15-30 microns in size (Amperit #151, special grade, commercially available from H.C. Starck Inc.) was deposited. Standoff distance of the nozzle was 30 mm and the powder feed rate was approximately 50 g/min. A cold sprayed weld of approximately 0.040 to 0.060" thick was used to coat the steel, and seal the gap between the tantalum cladding. The cold sprayed tantalum completely filled the gap between the two sheets providing a continuous protective layer of tantalum over both the steel and the tantalum sheet. The cold spray nozzle or gun used was a Kintetiks 4000 commercially available from Cold Gas Technology GmbH, Ampfing, Germany.

While it is well known that sheet tantalum will provide an impervious, protective barrier, this is not always true of powder based coatings. In order for the powder based coating to be protective, it must not only in itself resist corrosive attack but it must also be sufficiently dense (with no interconnected porosity) to prevent percolation by the acids through the coating. Typically for a coating to prevent percolation via interconnected porosity, the coating must be greater than 95% dense. In the tests conducted, the cold sprayed tantalum coating densities were typically greater than 97.5%.

To further prove the impervious nature of the coating, an approximate 0.015" thick tantalum coating was sprayed on nominal 2"×2" mild steel sheet. The same process parameters and equipment used above were used to make these coatings, with the exception that the final coating was approximately 0.014" thick. The tantalum coated side of the steel was then exposed to a 20% hydrochloric acid solution maintained at 70° C. for a period of 4 weeks. When compared to a tantalum sheet that was exposed to the same acid for the same period of time, the cold sprayed tantalum coating resisted the acid as well as the tantalum sheet. In fact in both cases the measured corrosion rates for both the sheet and the coating were less than 0.01 mm/year. After exposure to the acid test, porosity was almost nonexistent, was certainly not interconnected and the coating acted as an impervious barrier to the acid as is evidenced by the complete lack of corrosion build up between the coating and the steel.

Figure 5:
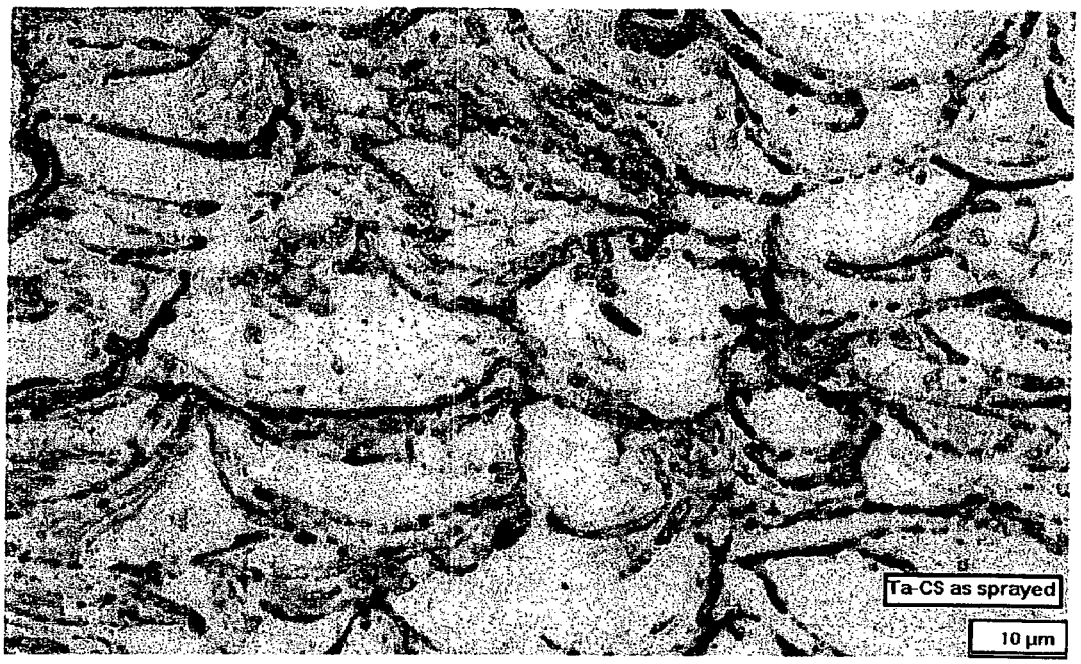
FIG. 5 is a micrograph of a cross section of a tantalum cold sprayed joint that has been etched to reveal prior particle boundaries.

Further, the cold sprayed joint is unique in that it produces no heat affected zone ("HAZ") around the weld compared to thermally induced fusion processes. HAZ is well known and understood by those skilled in the art. In thermally induced fusion bonding, the practice is to carefully minimize potential deleterious effects associated with the HAZ such as excessive directional and crystallographically preferred grain growth. FIG. 5 is a micrograph of a cross section of a tantalum cold sprayed joint that has been etched to reveal the prior particle boundaries ("PPB"). The powder that was used in the spray process was made by the hydride/dehydride process which produces a blocky approximately equiaxed powder (defined as powder having an aspect ratio of approximately 1). The PPBs in FIG. 5 are not equiaxed. In fact they are typically elongated in shape with an aspect ratio of 2 to 3 normal to the direction of spray (it is expected that in the future, as higher gas velocities and higher particle and gas temperatures are used, aspect ratios up to 6 may be obtained). Additionally by using electron beam back scattered diffraction ("EBSD"), it can be shown that the crystallographic orientation of the weld material is completely random. The combined properties of the complete absence of a HAZ with elongated shaped grains, normal to the direction of spray, having a completely random crystallographic orientation are a unique characteristic of a cold sprayed joint.

Figure 6:
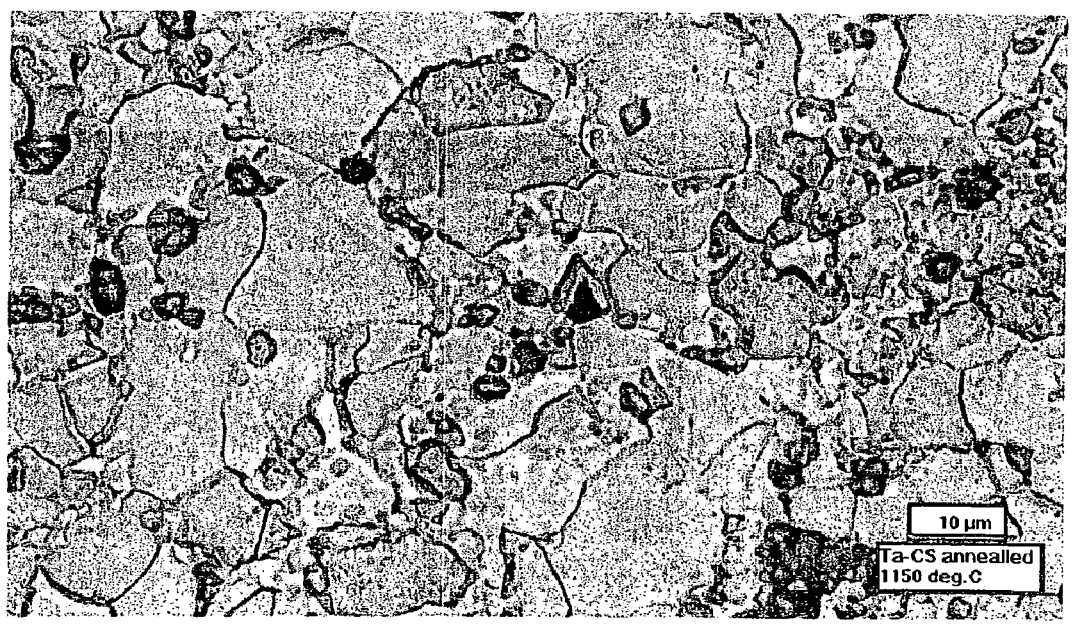
FIG. 6 shows the same cross section as shown in FIG. 5 after annealing at 1150° C. for one and a half hours.

There may be some circumstances in which it is desirable to heat treat an as sprayed joint post spraying either to relieve some of the mechanical stresses or to improve interparticle bond strength. This heat treatment can result in recrystallization which results in equiaxed grains of approximately the same size as the original powder particles. FIG. 6 is a micrograph of the same joint as shown in FIG. 5 that has been annealed at 1150° C. for 1.5 hours. The new equiaxed grains retain the near perfect random crystallographic orientation displayed in the original as sprayed structure as can be shown by EBSD analysis. Again the joint has a unique structure of fine, non-directional equiaxed grains that have a random crystallographic orientation.

While certain procedures have been illustrated or described herein, it will be recognized that variations can be used without departing from the basic teachings herein.

What is claimed is:

1. A method of joining clad structures, the method comprising:
    providing first and second clad structures each comprising a protective layer disposed only partially over a steel layer such that an edge region of the steel layer is exposed;
    joining the first and second clad structures at their respective edge regions, thereby forming a joint; and
    cold spraying a metal powder over and in contact with (i) the joint, (ii) the edge regions, and (iii) the protective layers of the first and second clad structures to form a layer of unmelted metal powder which directly connects the protective layers of the first and second clad structures.

2. The method of claim 1, wherein the protective layers each comprise at least one of tantalum, niobium, titanium, zirconium, molybdenum, or tungsten.

3. The method of claim 1, wherein the protective layers of the first and second clad structures are not welded together before cold spraying the metal powder.

4. The method of claim 1, wherein the protective layers are substantially resistant to at least one of acid or corrosion.

5. The method of claim 1, wherein, for each of the first and second clad structures, the protective layer is disposed over substantially all of a top surface of the steel layer except for the exposed edge region.

6. The method of claim 1, wherein, for each of the first and second clad structures, the protective layer is irreversibly attached to the steel layer.

7. The method of claim 1, wherein after cold spraying the layer of unmelted metal powder is substantially free of oxygen.

8. The method of claim 1, wherein, in each of the first and second clad structures, the protective layer is disposed directly over and in contact with the steel layer.

9. The method of claim 1, wherein a structural adhesive, a low-temperature brazing material, or a low-temperature solder is disposed between and in direct contact with the protective layer and the steel layer of each of the first and second clad structures.

10. The method of claim 9, wherein a structural adhesive having a decomposition temperature less than approximately 300° C. is disposed between and in direct contact with the protective layer and the steel layer of each of the first and second clad structures.

11. The method of claim 9, wherein a low-temperature solder having a melting point less than approximately 400° C. is disposed between and in direct contact with the protective layer and the steel layer of each of the first and second clad structures.

12. The method of claim 1, wherein joining the first and second clad structures comprises welding the steel layers.

13. The method of claim 12, wherein the welding is performed at a temperature above a melting point of the steel layers.

14. The method of claim 12, wherein welding the steel layers comprises providing a butt weld or a lap weld.

15. The method of claim 1, wherein providing the first and second clad structures comprises cold spraying the protective layer on the steel layer.

16. The method of claim 1, wherein a thickness of the protective layer of the first and second clad structures ranges between approximately 0.005 inches and approximately 0.02 inches.

17. The method of claim 16, wherein the thickness of the protective layer of the first and second clad structures ranges between approximately 0.005 inches and approximately 0.01 inches.

18. The method of claim 1, wherein the layer of unmelted metal powder comprises elongated particles having a random crystallographic orientation.

19. The method of claim 1, wherein the layer of unmelted metal powder has a density greater than approximately 95%.

20. The method of claim 19, wherein the layer of unmelted metal powder has a density greater than approximately 97.5%.

21. The method of claim 1, further comprising annealing the layer of unmelted metal powder for at least one of relieving mechanical stress or improving interparticle bond strength.

22. The method of claim 21, wherein the annealing recrystallizes at least a portion of the layer of unmelted metal powder.

23. The method of claim 21, wherein the annealing is performed at a temperature greater than approximately 1150° C.

24. The method of claim 1, wherein the steel layer of each of the first and second clad structures comprises stainless steel.

* * * * *